US007398276B2

(12) United States Patent
Kirovski et al.

(10) Patent No.: US 7,398,276 B2
(45) Date of Patent: Jul. 8, 2008

(54) PARALLEL PREDICTIVE COMPRESSION AND ACCESS OF A SEQUENTIAL LIST OF EXECUTABLE INSTRUCTIONS

(75) Inventors: Darko Kirovski, Bellevue, WA (US); Milenko Drinic, Los Angeles, CA (US); Hoi Huu Vo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 10/160,791

(22) Filed: May 30, 2002

(65) Prior Publication Data

US 2003/0225775 A1    Dec. 4, 2003

(51) Int. Cl.
*G06F 17/00* (2006.01)
*G06F 12/00* (2006.01)
*G06F 9/30* (2006.01)

(52) U.S. Cl. ......................... 707/101; 707/203; 712/200

(58) Field of Classification Search ............... 707/1–10, 707/100–102, 200–205, 104.1, 8; 711/3, 711/125; 712/200, 210

See application file for complete search history.

(56) References Cited

U.S. PATENT DOCUMENTS

| | | | | | |
|---|---|---|---|---|---|
| 5,694,126 | A | * | 12/1997 | Matsushiro | 341/50 |
| 6,028,635 | A | * | 2/2000 | Owen et al. | 375/240.18 |
| 6,100,824 | A | * | 8/2000 | MacLeod et al. | 341/51 |
| 6,118,391 | A | * | 9/2000 | Wecker | 341/55 |
| 6,191,711 | B1 | * | 2/2001 | Smith | 341/84 |
| 6,247,015 | B1 | * | 6/2001 | Baumgartner et al. | 707/101 |
| 6,317,867 | B1 | * | 11/2001 | Elnozahy | 717/107 |
| 6,349,150 | B1 | * | 2/2002 | Jones | 382/238 |
| 6,388,585 | B1 | * | 5/2002 | Lacerda | 341/51 |
| 6,518,895 | B1 | * | 2/2003 | Weiss et al. | 341/67 |
| 6,598,154 | B1 | * | 7/2003 | Vaid et al. | 712/237 |
| 6,618,506 | B1 | * | 9/2003 | Auerbach et al. | 382/232 |
| 6,618,728 | B1 | * | 9/2003 | Rail | 707/101 |
| 6,691,305 | B1 | * | 2/2004 | Henkel et al. | 717/136 |
| 6,704,361 | B2 | * | 3/2004 | Bublil et al. | 375/240.23 |
| 6,757,894 | B2 | * | 6/2004 | Eylon et al. | 717/177 |
| 6,834,283 | B1 | * | 12/2004 | Satoh | 707/101 |
| 6,879,266 | B1 | * | 4/2005 | Dye et al. | 341/51 |
| 6,883,087 | B1 | * | 4/2005 | Raynaud-Richard et al. | 712/213 |
| 6,885,319 | B2 | * | 4/2005 | Geiger et al. | 341/51 |
| 6,941,019 | B1 | * | 9/2005 | Mitchell et al. | 382/232 |
| 6,988,182 | B2 | * | 1/2006 | Teachman et al. | 712/37 |
| 7,051,189 | B2 | * | 5/2006 | Warnes | 712/210 |
| 2001/0013093 | A1 | * | 8/2001 | Banno et al. | 712/210 |
| 2001/0031092 | A1 | * | 10/2001 | Zeck et al. | 382/239 |
| 2001/0037399 | A1 | * | 11/2001 | Eylon et al. | 709/231 |
| 2001/0038642 | A1 | * | 11/2001 | Alvarez et al. | 370/477 |
| 2002/0001414 | A1 | * | 1/2002 | Sadeh | 382/250 |
| 2002/0042862 | A1 | * | 4/2002 | Breternitz et al. | 711/125 |
| 2002/0094127 | A1 | * | 7/2002 | Mitchell et al. | 382/250 |

(Continued)

*Primary Examiner*—Miranda Le
(74) *Attorney, Agent, or Firm*—Workman Nydegger

(57) ABSTRACT

Compression and decompression of data such as a sequential list of executable instructions (e.g., program binaries) by uniformly applying a predictive model generated from one segment of the executable list as a common predictive starting point for the other segments of the executable list. This permits random access and decompression of any segment of the executable list once a first segment (or another reference segment) of the executable list has been decompressed. This means that when executing an executable list (e.g., an executable file), a particular segment(s) of the executable list may not need to be accessed and decompressed at all if there are no instructions in that particular segment(s) that are executed.

27 Claims, 5 Drawing Sheets

U.S. PATENT DOCUMENTS

| | | | |
|---|---|---|---|
| 2002/0097172 A1* | 7/2002 | Fallon | 341/51 |
| 2002/0101367 A1* | 8/2002 | Geiger et al. | 341/51 |
| 2002/0116424 A1* | 8/2002 | Radermacher et al. | 708/203 |
| 2003/0009596 A1* | 1/2003 | Tonomura | 709/247 |
| 2003/0063676 A1* | 4/2003 | Prakash et al. | 375/240.27 |
| 2003/0074364 A1* | 4/2003 | Sewall et al. | 707/101 |
| 2003/0083049 A1* | 5/2003 | Matthews | 455/414 |
| 2003/0088537 A1* | 5/2003 | Ko | 707/1 |
| 2003/0130855 A1* | 7/2003 | Babu et al. | 704/500 |
| 2004/0025000 A1* | 2/2004 | Wise et al. | 712/300 |

* cited by examiner

PARALLEL PREDICTIVE COMPRESSION AND ACCESS OF A SEQUENTIAL LIST OF EXECUTABLE INSTRUCTIONS

BACKGROUND OF THE INVENTION

1. The Field of the Invention

The present invention relates to compression technology. More specifically, the present invention relates to methods, systems and computer program products for performing compression and decompression of a sequential list of computer-executable instructions (also called herein an "executable list") by uniformly applying a predictive model generated from one segment of the executable list as a common predictive starting point for the other segments of the executable list to thereby permit random access and decompression of the executable list even though the executable list was compressed using predictive compression techniques.

2. Background and Relevant Art

Computing systems have revolutionized the way people work and play. Original computing systems were rather monolithic, stand-alone mainframe computing systems often occupying entire rooms despite their relatively low processing and memory capabilities by modern standards. Currently, however, a wide variety of computing systems are available that are often even more powerful than their much larger mainframe ancestors. For example, a computing system may include a desktop computer, a laptop computer, a Personal Digital Assistant (PDA), a mobile telephone, or any other system or device in which machine-readable instructions (also called "program binaries" or simply "binaries") may be executed by one or more processors. Computers may even be networked together to allow information to be exchanged electronically even over large distances as when using the Internet.

Despite monumental advances in computing technology, computing systems still have limited memory resources and network bandwidth that will vary depending on the computing system. In order to preserve memory resources and network bandwidth, compression technology is often employed to reduce the size of a data segment (such as a file, program, software module, software library or any other identifiable segment) with minimal, if any, loss in information. While there are many varying compression technologies, all compression technologies reduce the size of a data segment by taking advantage of redundancies in the segment. By reducing the size of the data segment, the memory needed to store the data segment and the bandwidth needed to transmit the data segment are both reduced. The power requirements for processing compressed segments are also often reduced which is especially relevant to low power environments such as mobile devices.

Text is often compressed as the semantic and syntactic rules that structure the text also introduce a high degree of redundancy in the text. Patterns can be detected in such text that allow one to make reasonable guesses as to the text that follows based on the text that was just read. Skilled human readers with sufficient reading comprehension skills can, for example, often reasonably predict how a sentence will be completed before even reading the entire sentence. Such prediction would not be possible if the text was simply a random sequence of arbitrary text characters, following no syntactic or semantic rules.

Due to the predictability of text, text is said to have a high degree of local sequential correlation. That is, a human can make reasonable predictions as to what text will follow, based on the immediately preceding text. Even computers can make such reasonable predictions by creating a statistical model that may be used to predict the text character that will follow based on the immediately preceding text characters. Such statistical models are often called predictive models. One compression technology that takes advantage of the high degree of local sequential correlation in text is called Prediction by Partial Matching compression or "PPM" compression for short.

While both compressing and decompressing, PPM builds a predictive model of the input data-stream that aims at estimating the probability that a certain symbol occurs after a certain context. When compressing (and decompressing) a particular text file, the model is gradually built as the compression (and decompression) proceeds from beginning to end through the text file. The state of the predictive model as it exists when evaluating a particular point in the text file is naturally heavily dependent on the text that was encountered prior to that point.

PPM and other predictive compression techniques were previously primarily used to compress text information. However, PPM and other predictive compression techniques have also been used to compress program binaries. As used herein, "program binaries" mean a sequence of machine-level executable instructions. Like they did for text, the predictive compression and decompression techniques build a predictive model of the program binaries as it compresses or decompresses the program binaries. Here, however, instead of using a human language alphabet for text, a different alphabet is used that represents each of 256 possible values in each byte of the program binaries.

While compression of files does reduce the amount of information that needs to be communicated over a network or to/from a mass storage device, it is always beneficial to improve the bandwidth use of the network when accessing the compressed program binaries over a network, and improve the bandwidth use of the local read/write channel when accessing compressed program binaries from a local mass storage device. Accordingly, what are desired are methods, systems, and computer program products for reducing the bandwidth usage needed to access and run program binaries (or any other sequential list of computer-executable instructions for that matter) whether over a remote or local channel.

BRIEF SUMMARY OF THE INVENTION

The foregoing problems with the prior state of the art are overcome by the principles of the present invention, which are directed towards methods, systems and computer program products for compressing and decompressing segments of a sequential list of executable instructions (such as program binaries) using a common predictive starting point. Once the first segment in the sequential list (also called herein an "executable list") is compressed to form a common predictive model, that common predictive model may then be used as a common predictive starting point for compressing any other segment in the executable list, regardless of where that segment appears in the executable list.

Likewise, once the first segment in the executable list is decompressed to form the common predictive model, that common predictive model may then be used as a common predictive starting point for decompressing any other segment in the executable list, regardless of where that segment appears in the executable list. This permits random access and decompression of any segment of the executable list once a first segment (or another reference segment) of the executable list has been decompressed. This means that when executing an executable list, a particular segment of the executable list may not need to be accessed and decompressed at all if there are no instructions in that particular segment(s) that is executed.

Accordingly, processing resources are conserved since decompression of one or more of the segments in the executable list may be avoided. Also, the bandwidth between the system that stores the compressed version of the executable list, and the system that runs the executable list, may also be preserved since there is no need to transmit those compressed segments that are not actually executed.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for performing compression and decompression of a sequential list of executable instructions (also called herein an "executable list") by uniformly applying a predictive model generated from one segment of the executable list as a common predictive starting point for the other segments of the executable list. This permits random access and decompression of any segment of the executable list once a first segment (or another reference segment) of the executable list has been decompressed. This means that when running an executable list, a particular segment(s) of the executable list may not need to be accessed and decompressed at all if there are no instructions in that particular segment(s) that is executed.

Accordingly, processing resources are conserved since decompression of one or more of the segments in the executable list may be avoided. Also, the bandwidth between the system that stores the compressed version of the executable list, and the system that runs the executable list may also be preserved since there is no need to transmit those compressed segments that are not actually executed.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise tangible computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
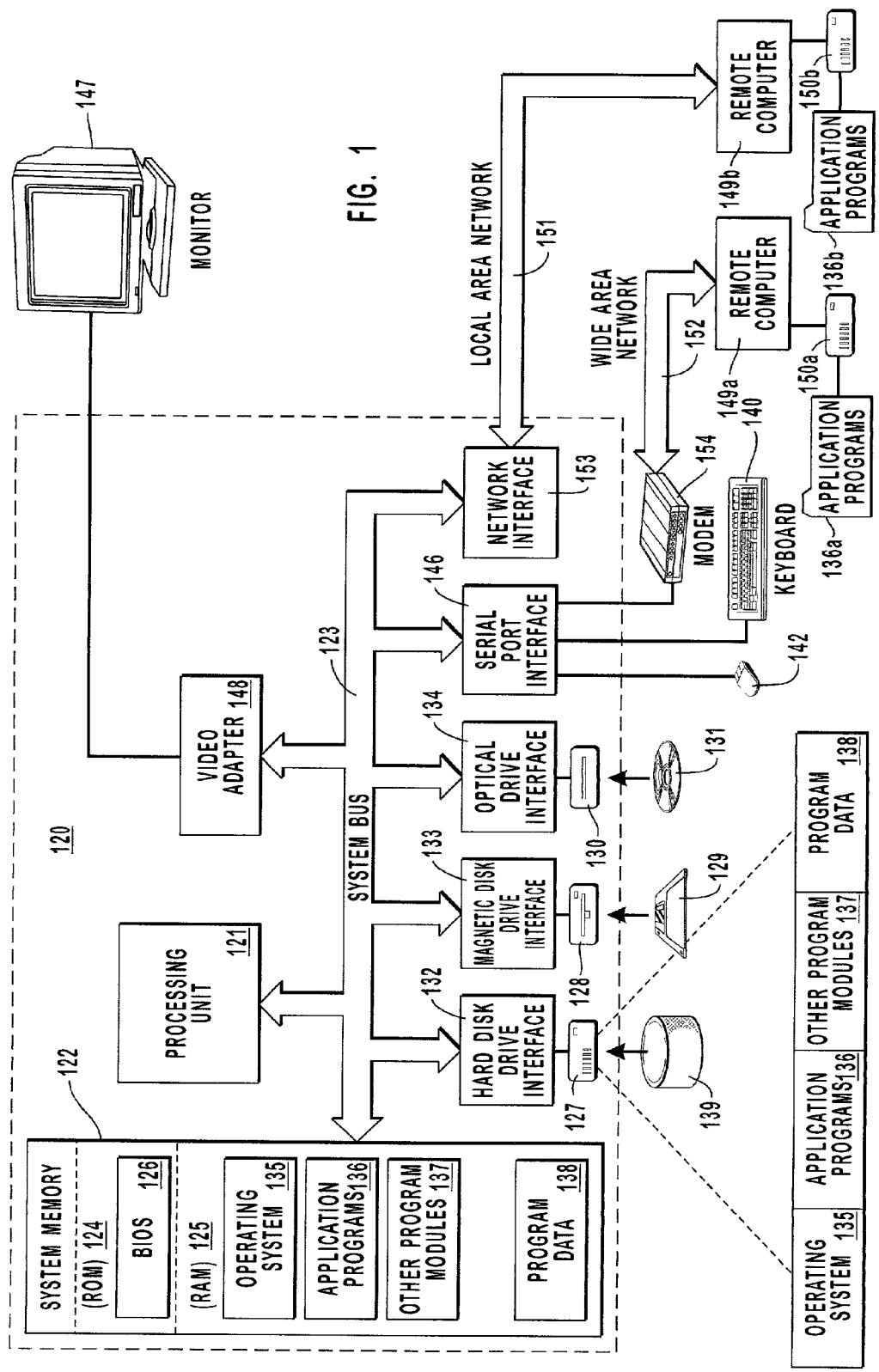
FIG. 1 illustrates a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

As previously mentioned, the principles of the present invention include the compression and decompression of a sequential list of executable instructions by uniformly applying a predictive model generated from one segment of the executable list as a common predictive starting point for the other segments of the executable list. First described is a method and system for compressing the executable list. Then, a method and system for decompressing the executable list will be described.

Figure 2:
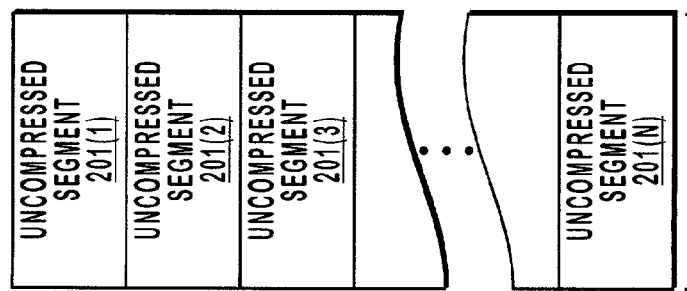
FIG. 2 illustrates an uncompressed sequential list of executable instructions segmented into a number of segments.

FIG. 2 illustrates an example executable list 201 in uncompressed form. The executable list is "sequential" in the sense that the program binaries reside in memory one after the other. Typical sequential lists of executable instructions have numerous jump operations in which execution often jumps to other points in the executable list, regardless of how the instructions are listed in the executable list. The uncompressed executable list 201 includes a number of uncompressed segments 201(1) through 201(N), where "N" is any integer three or greater. Although not required, each segment may include one or more complete functions.

Figure 3A:
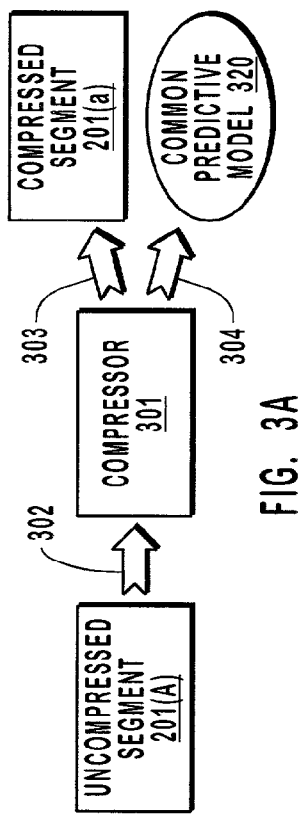
FIGS. 3A through 3C illustrate logical data flow relating to the compression of the sequential list of executable instructions in accordance with the principles of the present invention.
Figure 3B:
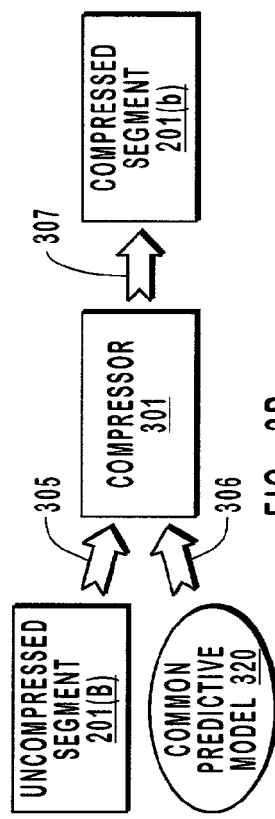
Figure 3C:
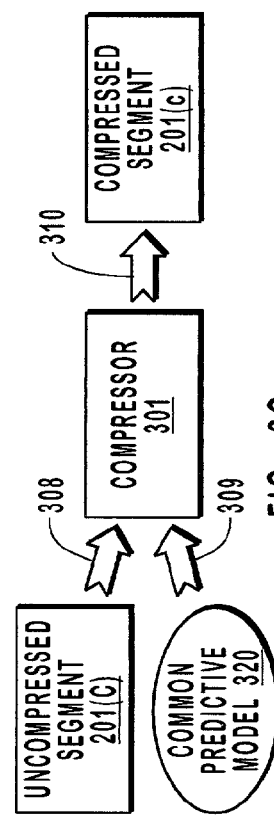
Figure 5:
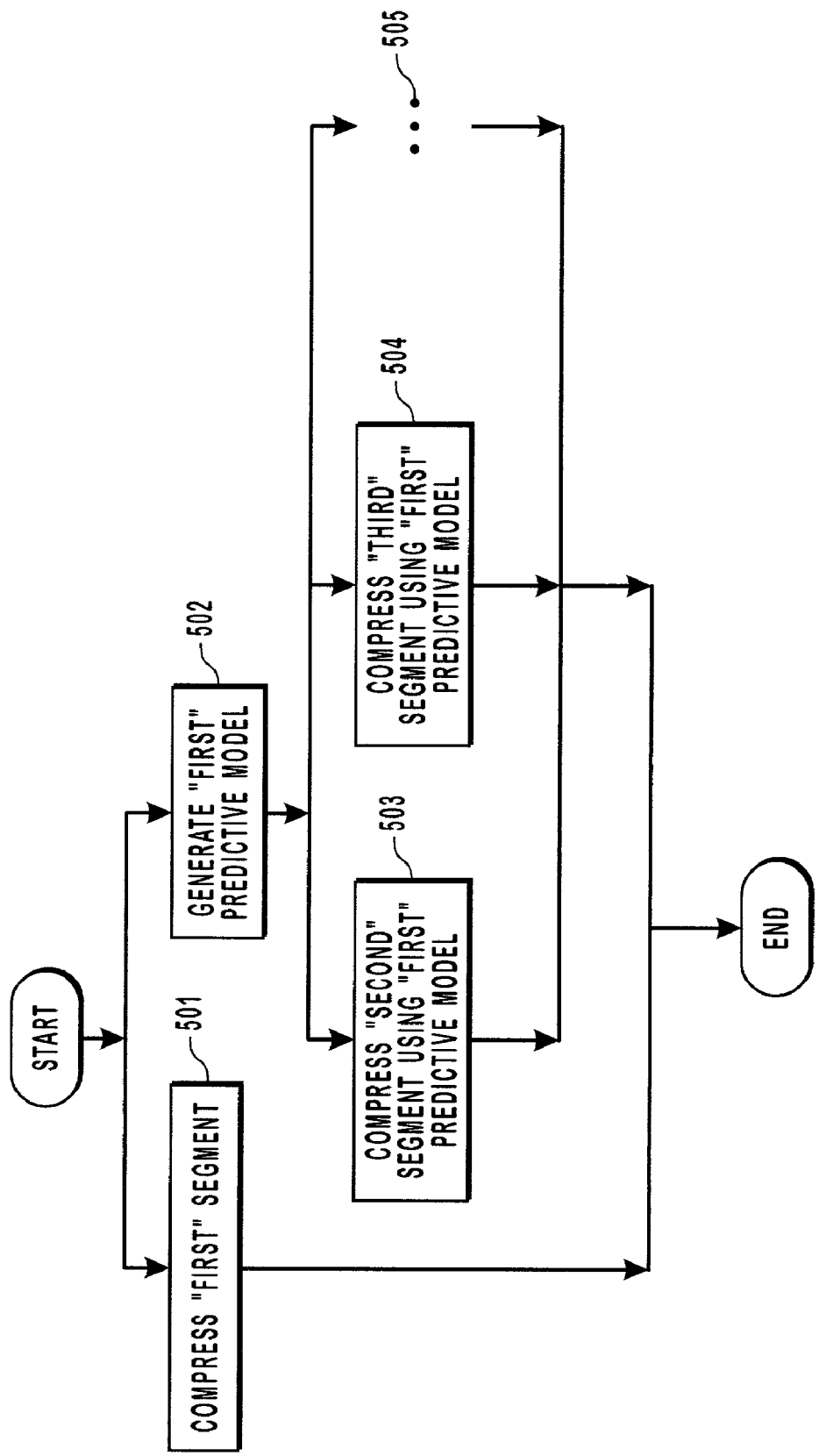
FIG. 5 illustrates a method of compressing in accordance with the present invention.

FIG. 5 illustrates a method 500 of compression. FIGS. 3A, 3B, and 3C illustrates various logical flows involved within the compression method. Accordingly, the logical flows of FIGS. 3A, 3B and 3C will now be described with frequent reference to the flowchart of FIG. 5. The method 500 may be implemented by a processing system including the computer 120 described above with respect to FIG. 1. As used herein, a "processing system" includes any device or computer with one or more processors, or any combination of one or more such devices and/or one or more such computers that are interconnected so as to cooperative perform functions such as, for example, compression or decompression.

The method 500 includes an act of compressing a "first" segment (act 501) of the executable list using a sequence of symbols that represents the first segment. Referring to FIG. 3A, this is represented by the compressor 301 accessing the uncompressed segment 201(A) (see arrow 302), and then generating a corresponding compressed segment 201(*a*) (see arrow 303), where uncompressed segment 201(A) is any one of the uncompressed segments 201(1) through 201(N), and where compressed segment 201(*a*) is any one of the uncompressed segments 201 (i) through 201(*n*). Throughout this description, uncompressed segments are represented by a parenthetical suffix that includes large symbols 1, 2, 3 through N. Corresponding compressed segments are represented by parenthetical suffixes that include a corresponding small symbols i, ii, iii through n.

The method 500 also includes an act of generating a "first" predictive model (act 502) using the sequence of symbols that represents the first segment. Referring to FIG. 3A, this is represented by compressor 301 generating common predictive model 320 (see arrow 304).

The predictive model is identified as the "first" predictive model only since it was generated using the same sequence of symbols as represents the "first" segment. The use of the term "first" to describe the predictive model should not be construed as requiring that no previous predictive models had been generated. However, the "first" predictive model is significant, as it will serve as a common predictive starting point for generating a number of other segments in the sequential list of program binaries. The "first" segment is the "first" segment only to distinguish it from other segments in the executable list. The use of the term "first" to describe the first segment should not be construed as requiring that the first segment be sequentially the initial segment in the executable list. In one embodiment, the "first" segment is simply a segment that includes one or more functions (e.g., kernel functions) that are more commonly used when executing the executable list.

Note that the method 500 includes the act of compressing the first segment (act 501) and the act of generating a first predictive model (act 502) as occurring in parallel. This is meant to emphasize that the first predictive model need not be generated as a byproduct of compressing the first segment. However, in one embodiment, the compression occurs using a compression technology (such as PPM or any of its variants or improvements) in which the first predictive model is generated as a byproduct of compressing the first segment. In those embodiments, the first predictive model may be generated at the same time that the first segment is compressed.

After the first predictive model is generated (act 502), the first predictive model is then used as a common predictive starting point for the other segments in the executable list. In particular, the method 500 then includes an act of compressing a "second" segment in the executable list using the first predictive model (act 503) as a predictive starting point. Referring to FIG. 3B, this is represented by compressor 301 receiving an uncompressed segment 201(B) (see arrow 305) and the common predictive model 320 (see arrow 306) generating a compressed segment 201(b) (see arrow 307), where 201(B) represents any uncompressed segment 201(1) through 201(N) other than 201(A), and where 201(b) represents any compressed segment 201(i) through 201(n) other than 201(a).

Accordingly, any one of the uncompressed segments 201(1) through 201(N) may be used to generate a common predictive model that will be used as a common predictive starting point when compressing each of at least some (and potentially all) of the remainder of the uncompressed segments 201(1) through 201(N). Compression of these remaining segments using the common predict model 320 is represented in FIG. 5 with horizontal ellipses 505.

Figure 4:
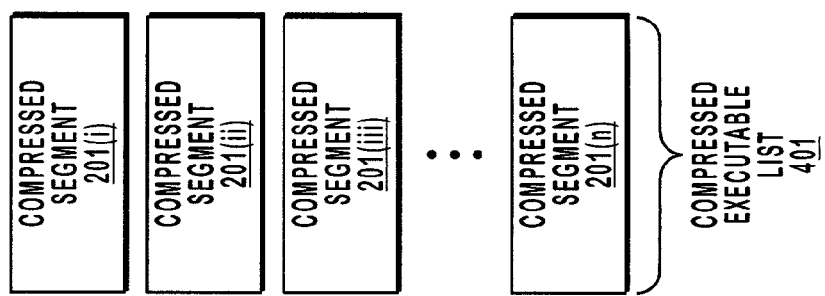
FIG. 4 illustrates a compressed version of the sequential list of executable instructions segmented into a number of segments.

FIG. 4 illustrates the corresponding compressed segments when all of the remainder of the segments are compressed using the common predictive model as a starting point. Here, the compressed segments are shown unconnected. This is to emphasize one of the advantages of the present invention that will become clearer in the description of the decompression method and system that will now be described.

In particular, the executable list may now be executed without having to necessarily have access to the entire executable list. Instead, segments may be downloaded as needed beginning with the "first" segment that is used to generate the common predictive model. Then, as it is determined that there is a reasonable likelihood that execution will proceed to another segment, that segment may be downloaded and decompressed using the common predictive model.

This permits a type of random access of the segments even though the executable list was compressed using a predictive model. If the executable list had simply been compressed as a monolithic structure from beginning to end using predictive modeling, the entire executable list would have to be downloaded in order for the executable list to be properly executed. Now, instead, if a segment is not needed, it need not be accessed with the exception of the "first" segment that is used to generate the common predictive model.

Figure 6:
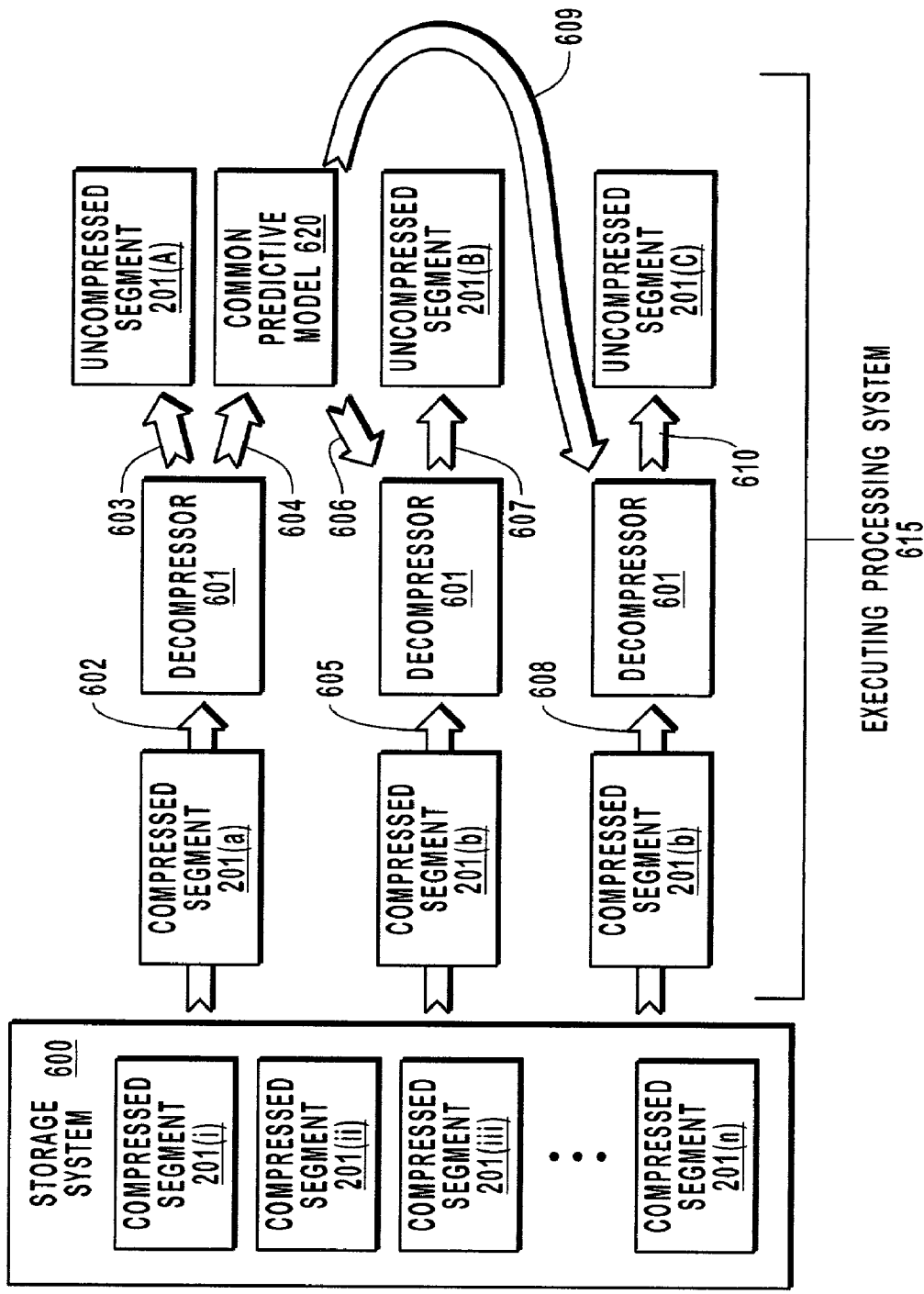
FIG. 6 illustrates logical data flow relating to the decompression of the sequential list of executable instructions in accordance with the principles of the present invention.
Figure 7:
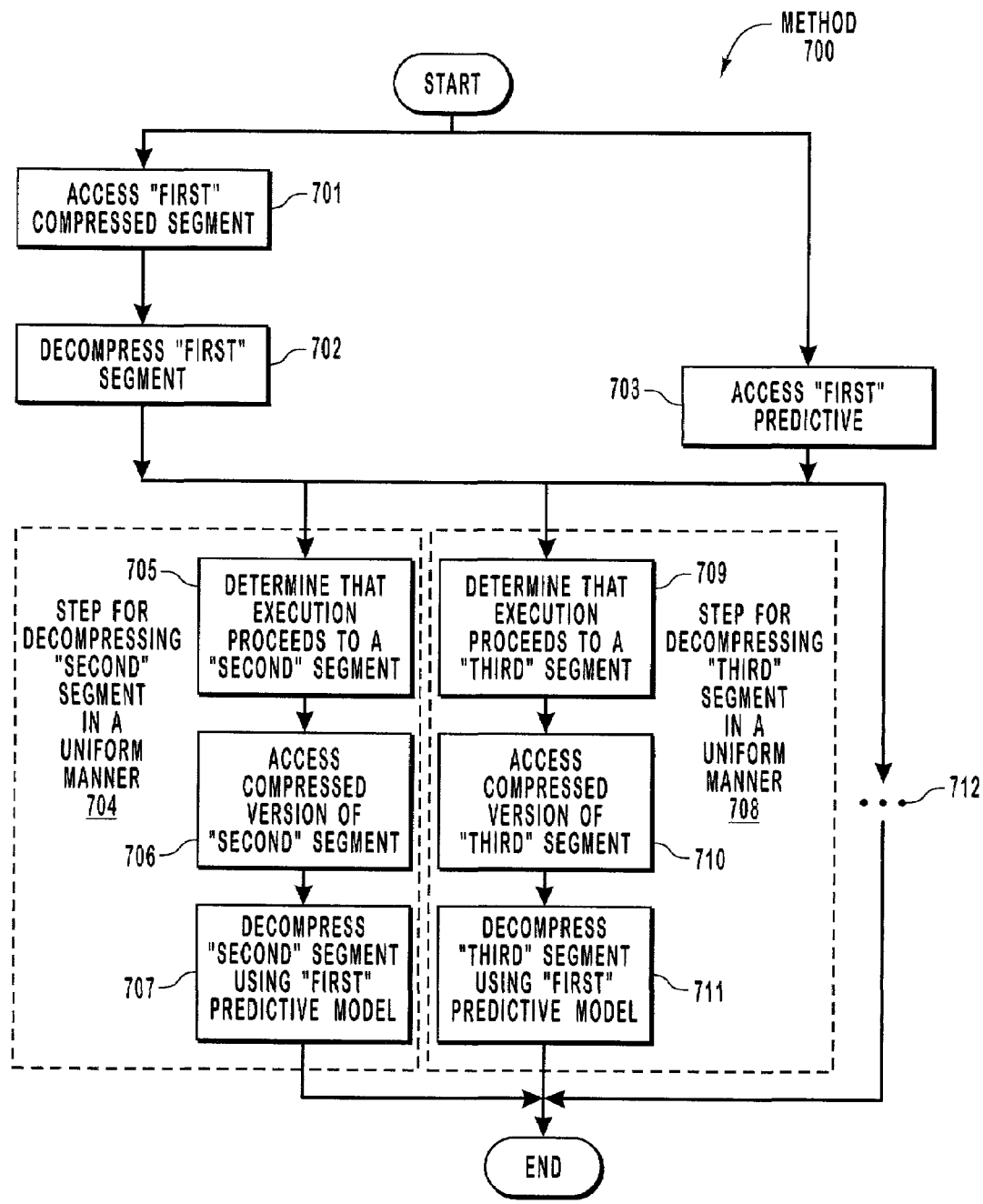
FIG. 7 illustrates a method of decompressing the sequential list of executable instructions in accordance with the present invention.

FIG. 6 illustrates several logical data flows involved with decompressing the sequential list of program binaries. The logical flow of FIG. 6 involves two systems, an executing processing system 615 that executes the executable list, and a storage system 600 that stores a compressed version of the executable list. FIG. 7 illustrates a method 700 in the form of a flowchart for decompressing the executable list. Accordingly, the logical data flows of FIG. 6 will now be described with frequent reference to the flowchart of FIG. 7.

The method 700 includes an act of accessing a compressed version of the first segment (act 701). Referring to FIG. 4, this includes a decompressor 601 accessing a compressed segment 201(a) from the storage system 600 (see arrow 602). Then, the method 700 decompresses the first segment (act 702). This is represented by the decompressor 601 generating uncompressed segment 201(A) (see arrow 603).

The method 700 also includes accessing a first predictive model (act 703) that was generated using the sequence of symbols that represents the first segment. This is represented by the compressor 601 generating the common predictive model 620 (see arrow 604). Note that if the compression and decompression mechanisms are both PPM, then the common predictive model 620 used to decompress segments of the executable list, is the same as the predictive model 320 used to compress segments of the executable list. Also, although the act of accessing the first predictive model (act 703) is shown as occurring in parallel with the acts of accessing the first compressed segment (act 701) and decompressing the first segment (act 702), the first predictive model may be generated as a byproduct of having decompressed the first segment.

The method 700 then includes several functional result-oriented steps that may occur in parallel and/or in series as desired. This includes a step for decompressing a second segment of the executable list in a uniform manner (step 704). This step 704 includes any corresponding acts that accomplish this result. However, in the illustrated example, the step 704 includes corresponding acts 705, 706, and 707.

In particular, it is determined that execution of the executable list will (or at least might possibly) proceed to a second segment. In other words, it is determined that a second segment of the sequential list of executable instructions is desirable for execution of the executable list (act 705). This determination may be made upon detecting a jump instruction to an address location within the second segment, or the executing processing system may instead make that determination based on historical statistics regarding how often execution proceeds to the second segment.

Next, the execution processing system 615 accesses the compressed version of the second segment (act 706) of the executable list. In FIG. 6, this is represented by decompressor 601 accessing the compressed segment 201(b) (see arrow 605). Then, the execution processing system 615 decompresses the second segment (act 707) of the executable list using the first predictive model as a predictive starting point. In FIG. 6, this is represented by the decompressor 601 accessing the common predictive model 620 (see arrow 606), and then forming the uncompressed segment 201(B) (see arrow 607).

The method 700 also includes a functional result-oriented step for decompressing a third segment of the executable list in a uniform manner (step 708). Step 708 includes corresponds acts that are similar to those described above for step 704, except that the determination is made that execution will proceed (or may have a reasonable possibility of proceeding) to a third segment of the sequential list of program binaries (act 709). Then, the third segment is accessed (act 710) (see arrow 608 in FIG. 6) and decompressed using the first predictive model as a common predictive model (act 711) (see arrows 609 and 610 in FIG. 6). The method may also include other similar steps for decompressing other segments, the steps including similar corresponding acts as described above for steps 704 and 708. These other steps are represented by horizontal ellipses 712.

The common predictive model may be used to decompress any other segment in a number of different ways. One way involves simply copying the common predictive model prior to decompression of another segment, then progressing a copy of the predictive model as decompression proceeds through the segment, and then discarding the altered predictive model once decompression of the second segment completes.

Another way involves progressing the common predictive model as the segment is being compressed. However, a list of amendments to the common predictive model is maintained as changes to the predictive model are made as a consequence of the decompression of the segment. Then, once the decompression of the segment is complete, the list of amendments is consulted to undo the progress of the predictive model to thereby return to the original state of the common predictive starting point.

Yet another way involves not progressing the common predictive model at all when compressing segments. Instead, the common predictive model is used to compress each symbol in the segment without any modification whatsoever.

Accordingly, methods, systems, and computer program product have been described for compressing and decompressing segments of an executable list using a common predictive starting point. Accordingly, once the first segment in the executable list is compressed to form a common predictive model, that common predictive model may then be used as a common predictive starting point for compression any other segment in the executable list, regardless of where that segment appears in the executable list. Likewise, once the first segment in the executable list is decompressed to form the common predictive model, that common predictive model may then be used as a common predictive starting point for decompressing any other sequent in the executable list, regardless of where that segment appears in the executable list.

While compression and decompression of executable lists have been described in detail, the principles of the present invention may also be employed to compress and decompress any data. The data is divided into multiple components. Then one of the components is compressed (or decompressed) to form the common predictive starting point. Then, some or all of the remaining portions may also be compressed (or decompressed) using the common predictive starting point.

For example, this compression technique may be used to compress a database. Accordingly, one need not download and decompress the entire database in order to access desired information in the database. Instead, one need only access the common predictive starting point by, for example, downloading and decompressing an initial segment of the database. Then, if the desired information does not happen to be in that initial portion, the segment containing the desired information is downloaded and decompressed using the common predictive starting point.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for decompressing segments of data as needed and without requiring sequential selection or decompression of the data even though the compression was performed using predictive models, the method comprising the following:

an act of accessing a compressed version of a first segment of the data, the first segment being represented by a sequence of symbols;

an act of decompressing the first segment of the data;

an act of accessing a first predictive data decompression model which operates by predicting characters or symbols based on sequential processing of immediately preceding characters or symbols, wherein the first predictive data decompression model was generated using the sequence of symbols that represents the first segment;

an act of determining that a second segment of the data is desirable, wherein the second segment does not appear sequentially with the first segment in the data, wherein the act of determining that a second segment of the data is desirable comprises the following:

an act of executing an executable list within the first segment;

while executing within the first segment, detecting that an instruction is needed from the second segment, wherein the act of detecting that an instruction is needed from the second segment comprises the following:

an act of detecting an instruction in the first segment to go to an address in the second segment;

an act of detecting the final instruction in the first segment;

an act of accessing a compressed version of the second segment of the data; and an act of decompressing the second segment of the data after decompressing the first segment, and using the first predictive data decompression model to predict characters or symbols in the second segment of data, wherein the first predictive data compression model acts as a predictive starting point such that when decompression of the second segment of data begins, the first predictive model is based only on the first segment of data, such that when decompression of the second segment of data begins, predictions of characters or symbols of the second segment of data, which is not sequential with the first segment, are based entirely on the first predictive model of the first segment of data, and exclude consideration of all intervening segments of data between the first segment of data and the second segment of data.

2. A method in accordance with claim 1, wherein the data is an executable list.

3. A method in accordance with claim 1, wherein the data is a database.

4. A method for decompressing segments of data as needed and without requiring sequential selection or decompression of the data even though the compression was performed using predictive models, the method comprising the following:

an act of accessing a compressed version of a first segment of the data, the first segment being represented by a sequence of symbols;

an act of decompressing the first segment of the data;

an act of accessing a first data decompression predictive model which operates by predicting characters or symbols based on sequential processing of immediately preceding characters or symbols, wherein the first data decompression predictive model was generated using the sequence of symbols that represents the first segment;

an act of determining that a second segment of the data is desirable, wherein the act of determining that a second segment of the data is desirable comprises the following:

an act of executing an executable list within the first segment;

while executing within the first segment, detecting that an instruction is needed from the second segment, wherein the act of detecting that an instruction is needed from the second segment comprises the following:

an act of detecting an instruction in the first segment to go to an address in the second segment;

an act of detecting the final instruction in the first segment;

an act of accessing a compressed version of the second segment of the data;

an act of decompressing the second segment of the data after decompressing the first segment, and using the first data decompression predictive model to predict characters or symbols in the second segment of data, wherein the first data decompression predictive model acts as a predictive starting point such that when decompression of the second segment of data begins, the first data decompression predictive model is based only on the first segment of data, such that when decompression of the second segment of data begins, predictions of characters or symbols of the second segment of data, which is not sequential with the first segment, are based entirely on the first predictive model of the first segment of data, and exclude consideration of all intervening segments of data between the first segment of data and the second segment of data;

an act of determining that a third segment of the data is desirable; an act of accessing a compressed version of the third segment of the data; and an act of decompressing the third segment of the data after decompressing the first segment, and using the first data decompression predictive model to predict characters or symbols in the third segment of data, wherein the first data decompression predictive model acts as a predictive starting point, wherein the first data decompression predictive model is a common starting point for decompressing both the second segment and the third segment of the data, such that when decompression of the third segment of data begins, predictions of characters or symbols of the third segment of data are based entirely on the first predictive model of the first segment of data, and exclude consideration of the second segment of data as well as any intervening segments of data between the first segment of data and the third segment of data.

5. A method in accordance with claim 4, wherein the data is a database.

6. A method in accordance with claim 4, wherein the data is an executable list.

7. A method in accordance with claim 6, wherein the act of accessing a compressed version of a first segment of the data comprises the following:

an act of accessing a compressed version of a first segment of the executable list from a local mass storage device.

8. A method in accordance with claim 6, wherein the act of accessing a compressed version of a first segment of the data comprises the following:

an act of receiving a compressed version of a first segment of the executable list over a network.

9. A method in accordance with claim 8, further comprising the following:

an act of requesting at least a portion of the executable list prior to the act of receiving a compressed version of a first segment of the executable list over a network.

10. A method in accordance with claim 6, wherein the first segment occurs at the beginning of the executable list, and wherein the second and third segments occur in no particular order after the first segment in the executable list.

11. A method in accordance with claim 6, wherein the first segment does not occur at the beginning of the executable list.

12. A method in accordance with claim 6, wherein the act of accessing a first data decompression predictive model that was generated using the sequence of symbols that represents the first segment comprises the following:

an act of generating the first data decompression predictive model as a byproduct of the act of decompressing the first segment of the data.

13. A method in accordance with claim 6, wherein the act of accessing a first data decompression predictive model that was generated using the sequence of symbols that represents the first segment comprises the following:

an act of accessing the first data decompression predictive model from a local mass storage device.

14. A method in accordance with claim 6, wherein the act of accessing a first data decompression predictive model that was generated using the sequence of symbols that represents the first segment comprises the following:

an act of receiving the first data decompression predictive model over a network.

15. A method in accordance with claim 6, wherein the act of determining that a second segment of the data is desirable comprises the following:

an act of utilizing historical statistics regarding how often execution proceeds to the second segment of the data.

16. A method in accordance with claim 4, wherein the second segment and the third segment are not connected to the first segment when accessed.

17. A method in accordance with claim 4, wherein the first segment, second segment, and third segment make up less than a complete set of the data, and less than the complete set of the data is decompressed.

18. A computer program product for decompressing segments of data as needed and without requiring sequential selection or decompression of the data even though the compression was performed using predictive models, the computer program product comprising one or more computer-readable physical storage media have stored thereon the following:

computer-executable instructions for causing a compressed version of a first segment of the data to be accessed, the first segments being represented by a sequence of symbols;

computer-executable instructions for decompressing the first segment of the data;

computer-executable instructions for causing a first data decompression predictive model that was generated using the sequence of symbols that represents the first segment to be accessed, the first data decompression predictive model operating by predicting characters or symbols based on sequential processing of immediately preceding characters or symbols;

computer-executable instructions for determining that a second segment of the data is desirable, wherein the act of determining that a second segment of the data is desirable comprises the following:

an act of executing an executable list within the first segment;

while executing within the first segment, detecting that an instruction is needed from the second segment, wherein the act of detecting that an instruction is needed from the second segment comprises the following:

an act of detecting an instruction in the first segment to go to an address in the second segment;

an act of detecting the final instruction in the first segment;

computer-executable instructions for causing a compressed version of the second segment of the data to be accessed;

computer-executable instructions for decompressing the second segment of the data using the first data decompression predictive model to predict characters or symbols in the second segment of data, wherein the first data decompression predictive model acts as a predictive starting point such that when decompression of the second segment of data begins, the first data decompression predictive model is based only on the first segment of data, such that when decompression of the second segment of data begins, predictions of characters or symbols of the second segment of data, which is not sequential with the first segment of data, are based entirely on the first predictive model of the first segment of data, and exclude consideration of all intervening segments of data between the first segment of data and the second segment of data, and wherein decompressing the second segment occurs after decompressing the first segment;

computer-executable instructions for determining that a third segment of the data is desirable;

computer-executable instructions for causing a compressed version of the third segment of the data to be accessed; and computer-executable instructions for decompressing the third segment of the data using the first data decompression predictive model to predict characters or symbols in the third segment of data, wherein the first data decompression predictive model acts as a predictive starting point such that when decompression of the third segment of data begins, the first data decompression predictive model is based only on the first segment of data, such that when decompression of the third segment of data begins, predictions of characters or symbols of the third segment of data are based entirely on the first predictive model of the first segment of data, and exclude consideration of the second segment of data as well as any intervening segments of data between the first segment of data and the third segment of data, and wherein decompressing the third segment occurs after decompressing the first segment and after decompressing the second segment.

19. A method for compressing data, the method comprising the following:

an act of compressing a first segment of the data using a sequence of symbols that represents the first segment;

an act of generating a first data compression predictive model which operates by predicting characters or symbols based on sequential processing of immediately preceding characters or symbols, and using the sequence of symbols that represents the first segment;

an act of compressing a second segment of the data using a sequence of symbols that represents a second segment of the data, and using the first data compression predictive model as a predictive starting point such that when compression of the second segment of data begins, the first data compression predictive model is based only on the first segment of data, such that when compression of the second segment of data begins, which is not sequential with the first segment of data, characters or symbols used for predicting, the second segment of data are based entirely on the first predictive model of the first segment of data, and exclude consideration of all intervening segments of data between the first segment of data and the second segment of data, wherein the act of compressing the second segment of the data is performed after the act of compressing the first segment;

wherein the act of compressing a second segment of the data using a sequence of symbols that represents a second segment of the data, and using the first data compression predictive model as a predictive starting point comprises the following:

an act of progressing the first data compression predictive model while compressing the second segment to thereby generate a second predictive model after compressing the second segment;

an act of generating a log that describes the transformations imposed on the first data compression predictive model as it changes to the second predictive model;

an act of reversing the transformations using the log to thereby change the second predictive model back to the first data compression predictive model; and an act of compressing a third segment of the data using a sequence of symbols that represents a third segment of the data, and also using the first data compression predictive model as a predictive starting point such that when compression of the third segment begins, the first data compression predictive model is based only on the first segment of data, such that when compression of the third segment of data begins, characters or symbols used for predicting the third segment of data are based entirely on the first predictive model of the first segment of data, and exclude consideration of the second segment of data and any intervening segments of data between the first segment of data and the third segment of data, and wherein the act of compressing the third segment of the data is performed after the act of compressing the first segment and after the act of compressing the second segment.

20. A method in accordance with claim 19, wherein the data is a database.

21. A method in accordance with claim 19, wherein the data is an executable list.

22. A method in accordance with claim 19, wherein the act of compressing a second segment of the data using a sequence of symbols that represents a second segment of the data, and using the first data compression predictive model as a predictive starting point comprises the following:

an act of copying the first data compression predictive model;

an act of progressing the first data compression predictive model while compressing the second segment to thereby generate a second predictive model after compressing the second segment; and an act of discarding the second predictive model.

23. A method in accordance with claim 19, wherein the act of compressing a second segment of the data using a sequence of symbols that represents a second segment of the data, and using the first data compression predictive model as a predictive starting point comprises the following:

an act of compressing the second segment using the first data compression predictive model and without changing the first data compression predictive model.

24. A computer program product for compressing data, the computer program product comprising one or more computer-readable physical storage media having stored thereon the following:

computer-executable instructions for compressing a first segment of the data using a sequence of symbols that represents the first segment;

computer-executable instructions for generating a first data compression predictive model which operates by predicting characters or symbols based on sequential processing of immediately preceding characters or symbols, and using the sequence of symbols that represents the first segment;

computer-executable instructions for compressing a second segment of the data after compressing the first segment, using a sequence of symbols that represents a second segment of the data, and using the first data compression predictive model as a predictive starting point such that when compression of the second segment of data begins, such that when compression of the second segment of data begins, which is not sequential with the first segment of data, characters or symbols used for predicting the second segment of data are based entirely on the first predictive model of the first segment of data, and exclude consideration of all intervening segments of data between the first segment of data and the second segment of data, and wherein the first data compression predictive model is based only on the first segment of data;

wherein the computer-executable instructions for compressing a second segment of the data using a sequence of symbols that represents a second segment of the data, and using the first data compression predictive model as a predictive starting point comprises the following:

computer-executable instructions for compressing the first data compression predictive model while compressing the second segment to thereby generate a second predictive model after compressing the second segment;

computer-executable instructions for generating a log that describes the transformations imposed on the first data compression predictive model as it changes to the second predictive model;

computer-executable instructions for reversing the transformations using the log to thereby change the second predictive model back to the first data compression predictive model; and computer-executable instructions for compressing a third segment of the data after compressing the first segment, using a sequence of symbols that represents a third segment of the data, and also using the first data compression predictive model as a predictive starting point such that when compression of the third segment begins, the first data compression predictive model is based only on the first segment of data, such that when compression of the third segment of data begins, characters or symbols used for predicting the third segment of data are based entirely on the first predictive model of the first segment of data, and exclude consideration of the second segment of data and any intervening segments of data between the first segment of data and the third segment of data, and wherein the act of compressing the third segment of the data is performed after the act of compressing the first segment and after the act of compressing the second segment.

25. A computer program product in accordance with claim 24, wherein the computer program products for compressing a second segment of the data using a sequence of symbols that represents a second segment of the data, and using the first data compression predictive model as a predictive starting point comprise the following:

computer-executable instructions for copying the first data compression predictive model;

computer-executable instructions for progressing the first data compression predictive model while compressing the second segment to thereby generate a second predictive model after compressing the second segment; and computer-executable instructions for discarding the second predictive model.

26. A computer program product in accordance with claim 24, wherein the computer-executable instructions for compressing a second segment of the data using a sequence of symbols that represents a second segment of the data, and using the first data compression predictive model as a predictive starting point comprise the following:

computer-executable instructions for compressing the second segment using the first data compression predictive model and without changing the first data compression predictive model.

27. A method for decompressing segments of data as needed and without requiring sequential selection or decompression of the data even though the compression was performed using predictive models, the method comprising the following:

an act of requesting at least a portion of an executable list;

after requesting the at least a portion of the executable list, an act of receiving a compressed version of a first segment of the executable list over a network, the first segment being represented by a sequence of symbols and including one or more kernel functions that are the most common used when executing the executable list;

an act of decompressing the first segment of the executable list, including the one or more kernel functions;

an act of accessing a first data decompression predictive model which operates by predicting characters or symbols based on sequential processing of immediately preceding characters or symbols, wherein the first data decompression predictive model was generated using the sequence of symbols that represents the first segment;

an act of determining that a second segment of the executable list is desirable, wherein the second segment does not appear sequentially with the first segment in the executable list and appears prior to the first segment in the sequential list, wherein the act of determining that a second segment of the data is desirable comprises the following:

an act of executing the executable list within the first segment;

while executing within the first segment, detecting that an instruction is needed from the second segment, wherein the act of detecting that an instruction is needed from the second segment comprises the following:
an act of detecting an instruction in the first segment to go to an address in the second segment;
an act of detecting the final instruction in the first segment;
an act of accessing a compressed version of the second segment of the executable list; and
an act of decompressing the second segment of the executable list after decompressing the first segment, and using the first data decompression predictive model to predict characters or symbols in the second segment of the executable list, wherein the first data decompression predictive model acts as a predictive starting point such that when decompression of the second segment of the executable list begins, the first data decompression predictive model is based only on the first segment of the executable list, such that when decompression of the second segment of the executable list begins, and which is not sequential with the first segment of the executable list, prediction of characters or symbols of the second segment of the executable list is based entirely on the first data decompression predictive model of the first segment of the executable list, and exclude consideration of all intervening segments of data between the first segment of the executable list and the second segment of the executable list, and wherein as the second segment of the executable list is decompressed, the first data decompression predictive model is progressed throughout sequential decompression of the second segment of the sequential list, such that all characters or symbols after the first character or symbol of the second segment are based only on the first segment of the executable list and preceding characters or symbols of the second segment of the executable list.

* * * * *